(No Model.)

C. S. BEEBE.
TWO WHEELED VEHICLE.

No. 394,050. Patented Dec. 4, 1888.

Witnesses.
Geo. W. Soung,
N. E. Oliphant.

Inventor.
Chas. S. Beebe.
By Stout & Underwood,
Attorneys.

UNITED STATES PATENT OFFICE.

CHARLES S. BEEBE, OF RACINE, WISCONSIN.

TWO-WHEELED VEHICLE.

SPECIFICATION forming part of Letters Patent No. 394,050, dated December 4, 1888.

Application filed June 8, 1888. Serial No. 276,441. (No model.)

*To all whom it may concern:*

Be it known that I, CHARLES S. BEEBE, of Racine, in the county of Racine, and in the State of Wisconsin, have invented certain new and useful Improvements in Two-Wheeled Vehicles; and I do hereby declare that the following is a full, clear, and exact description thereof.

My invention relates to two-wheeled vehicles; and it consists in certain peculiarities of construction and combination of parts, to be hereinafter described with reference to the accompanying drawings, and subsequently claimed.

Figure 1:
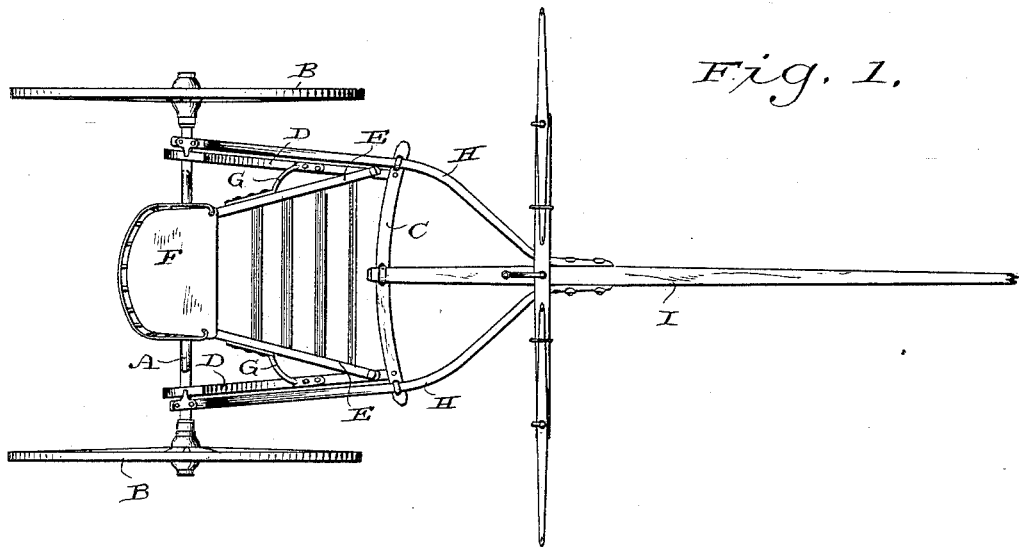
Figure 2:
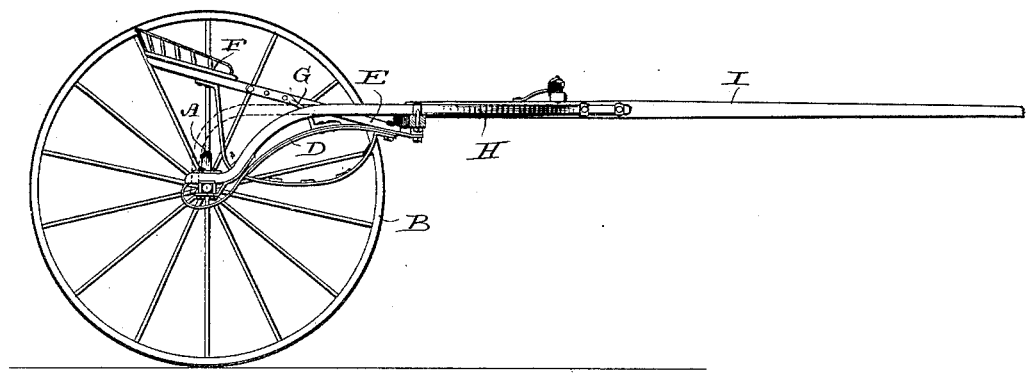

In the drawings, Figure 1 represents a plan view of a vehicle constructed according to my invention, and Fig. 2 a side elevation of the same.

Referring by letter to the drawings, A represents the axle; B, the wheels; C, the cross-bar; D, the springs, and E the bars for the seat F, these bars being connected to said springs by brace-irons G. The construction and arrangement of parts thus far described are similar to those shown in my patent, No. 342,996, issued June 1, 1886.

Rigidly secured to the axle and cross-bar—similar to the thills shown in the patent above noted—are side bars, H, the latter being bent in front of the cross-bar to extend in toward the center of draft of the vehicle, where their extremities are bolted or otherwise suitably secured to a pole, J, that is clipped to said cross-bar, as illustrated by Fig. 1.

By the construction above described I provide what is termed a "pole-cart" that is light and durable, and by means of the side bars, H, I secure a wider bearing for the pole J than is ordinarily the case in vehicles of the class to which my invention relates, while at the same time the axle receives the strain that comes upon the pole, and thus the cart has a greater stiffness and consequently greater strength than those in ordinary use.

Having thus fully described my invention, what I claim as new, and desire to secure by Letters Patent, is—

In a two-wheeled vehicle, the combination of the axle A, cross-bar C, side bars, D, having forward extensions bent in front of the cross-bar to come in toward the center of draft, the pole J, clipped to said cross-bar and bolted to the forward ends of said side bars, the springs D, seat-supporting bars E, and brace-irons G, substantially as set forth.

In testimony that I claim the foregoing I have hereunto set my hand, at Racine, in the county of Racine and State of Wisconsin, in the presence of two witnesses.

CHAS. S. BEEBE.

Witnesses:
    J. E. DODGE,
    J. E. BUSH.